United States Patent
Holt

(10) Patent No.: US 9,261,343 B1
(45) Date of Patent: Feb. 16, 2016

(54) TAPE MEASURE ATTACHMENT DEVICE

(71) Applicant: Randel Holt, Toms River, NJ (US)

(72) Inventor: Randel Holt, Toms River, NJ (US)

(*) Notice: Subject to any disclaimer, the term of this patent is extended or adjusted under 35 U.S.C. 154(b) by 144 days.

(21) Appl. No.: 14/089,972

(22) Filed: Nov. 26, 2013

(51) Int. Cl.
*G01B 3/10* (2006.01)

(52) U.S. Cl.
CPC ............ *G01B 3/1056* (2013.01); *G01B 3/1041* (2013.01); *G01B 3/1071* (2013.01); *G01B 3/1084* (2013.01); *G01B 2003/1076* (2013.01); *G01B 2003/1089* (2013.01)

(58) Field of Classification Search
CPC ............... G01B 2003/1089; G01B 2003/1076; G01B 3/1084; G01B 3/1056; G01B 2003/1074; G01B 3/1041; G01B 3/1071; G01B 2003/1043; G01B 2003/1053; G01B 3/002
USPC .................................... 33/759, 760, 769, 770
See application file for complete search history.

(56) References Cited

U.S. PATENT DOCUMENTS

| | | | |
|---|---|---|---|
| D390,795 S | 2/1998 | LaFrance | |
| 6,442,860 B1 | 9/2002 | Williams et al. | |
| 6,691,425 B1* | 2/2004 | Lee et al. | 33/759 |
| 6,694,622 B2 | 2/2004 | Kim | |
| 6,763,603 B2 | 7/2004 | Carrabino | |
| 7,131,215 B2* | 11/2006 | Kang | 33/769 |
| 7,260,898 B2* | 8/2007 | Snelson | 33/668 |
| D556,065 S | 11/2007 | Jones et al. | |
| 7,334,344 B2 | 2/2008 | Scarborough | |
| 7,845,093 B2 | 12/2010 | Smiroldo | |
| 8,020,312 B1* | 9/2011 | McGahan | 33/770 |
| 2003/0172540 A1* | 9/2003 | Carrabino | 33/770 |
| 2008/0141549 A1 | 6/2008 | Brown | |
| 2009/0249636 A1* | 10/2009 | Reda et al. | 33/760 |
| 2012/0073152 A1* | 3/2012 | McGahan | 33/32.3 |

* cited by examiner

*Primary Examiner* — Yaritza Guadalupe-McCall

(57) ABSTRACT

A tape measure attachment device marks and cuts an object at a desired measurement. The device includes a first attachment member having a lower wall and a perimeter wall coupled to and extending upwardly from the lower wall. An upper perimeter edge of the first attachment member defines an access opening into the first attachment member. The first attachment member is configured for attachment to a flanged end of a measuring tape. A cartridge is positionable within an interior of the first attachment member. The cartridge includes a pointed bottom end being extendable through the lower wall. The pointed bottom end is a cutting element configured to cut into an object positioned below the cutting element.

17 Claims, 5 Drawing Sheets

TAPE MEASURE ATTACHMENT DEVICE

BACKGROUND OF THE DISCLOSURE

Field of the Disclosure

The disclosure relates to tape measure accessory devices and more particularly pertains to a new tape measure accessory device for marking and cutting an object at a desired measurement.

SUMMARY OF THE DISCLOSURE

An embodiment of the disclosure meets the needs presented above by generally comprising a first attachment member having a lower wall and a perimeter wall coupled to and extending upwardly from the lower wall. An upper perimeter edge of the first attachment member defines an access opening into the first attachment member. The first attachment member is configured for attachment to a flanged end of a measuring tape. A cartridge is positionable within an interior of the first attachment member. The cartridge includes a pointed bottom end being extendable through the lower wall. The pointed bottom end is a cutting element configured to cut into an object positioned below the cutting element.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
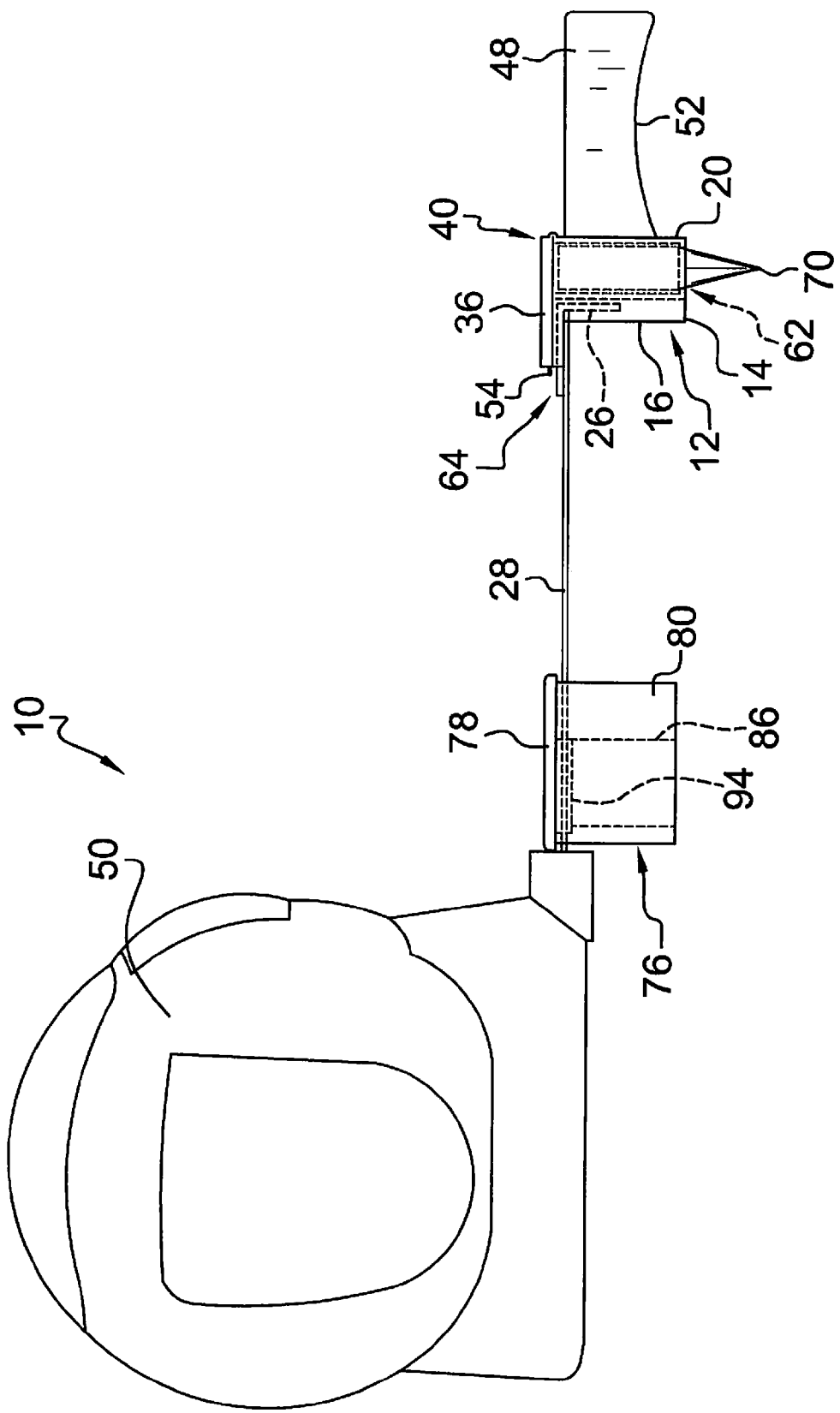
FIG. 1 is an in-use side view of a tape measure attachment device according to an embodiment of the disclosure.
Figure 2:
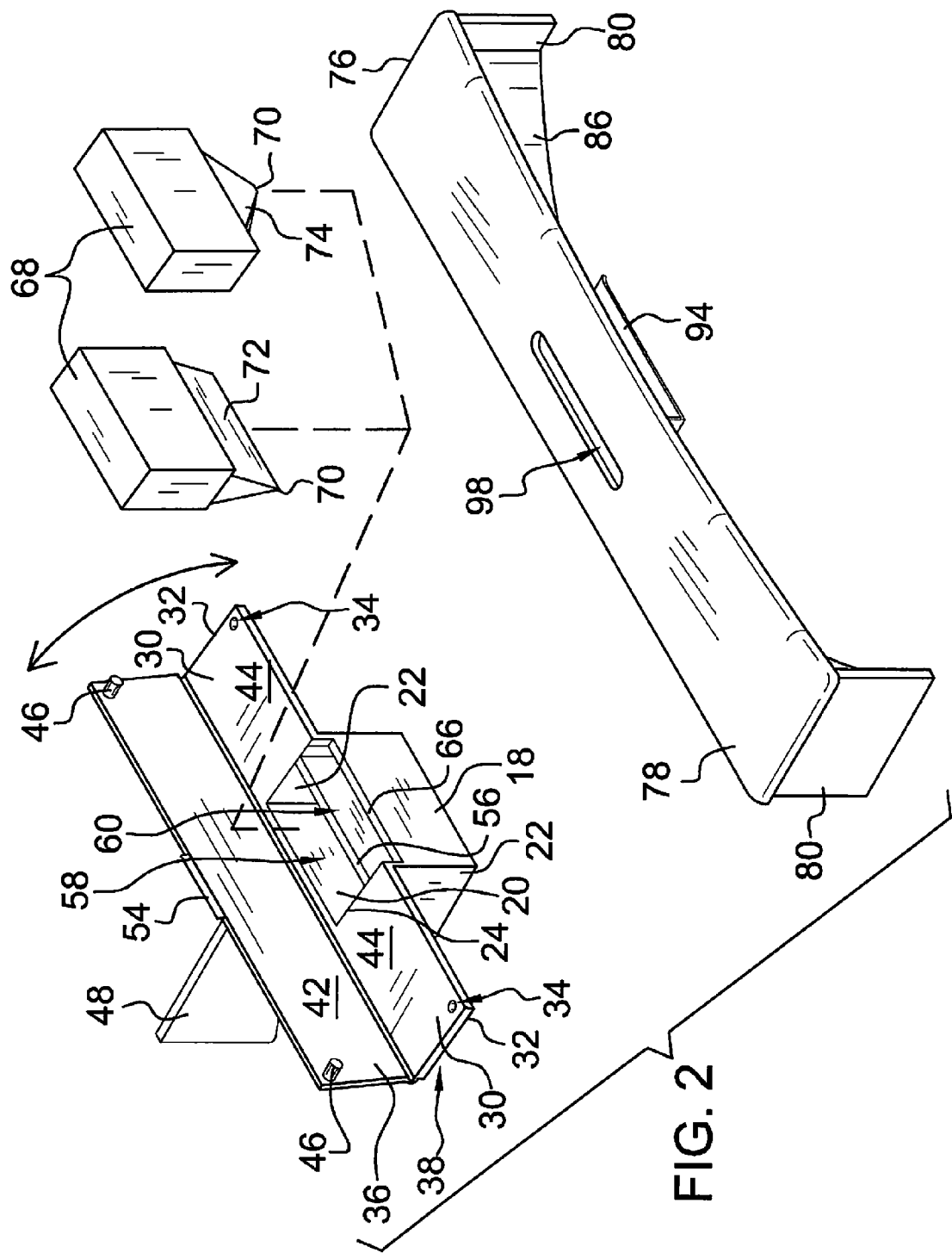
FIG. 2 is a partially-exploded front perspective view of an embodiment of the disclosure.
Figure 3:
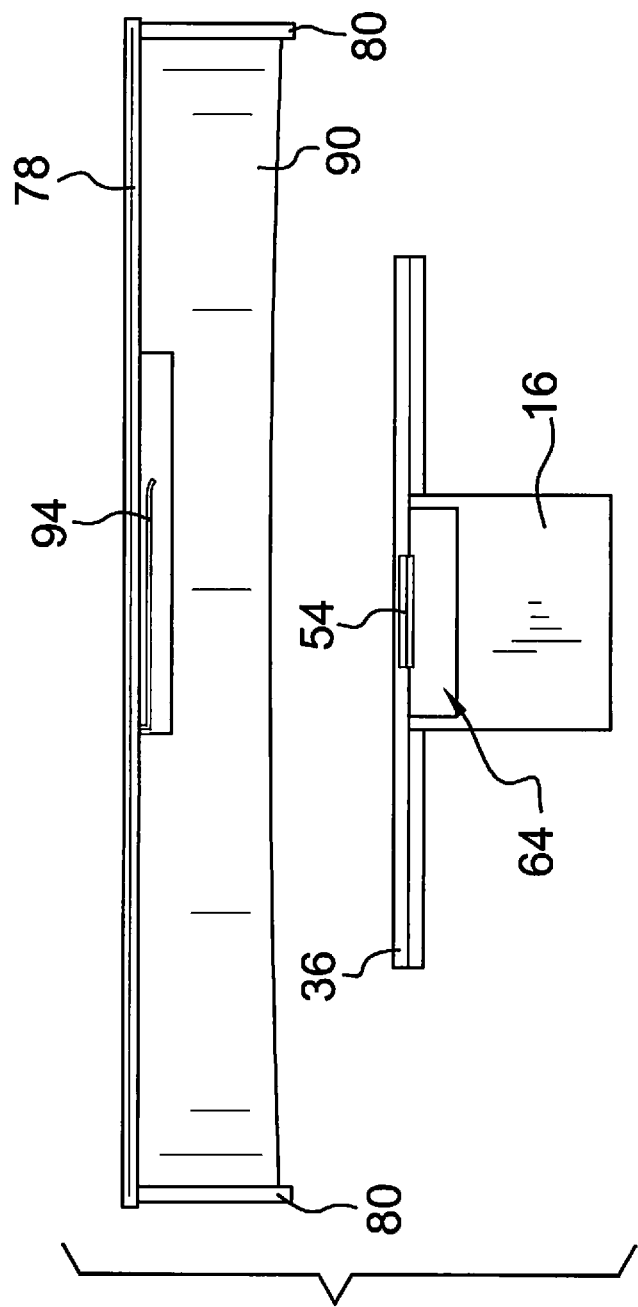
FIG. 3 is a front view of an embodiment of the disclosure.
Figure 4:
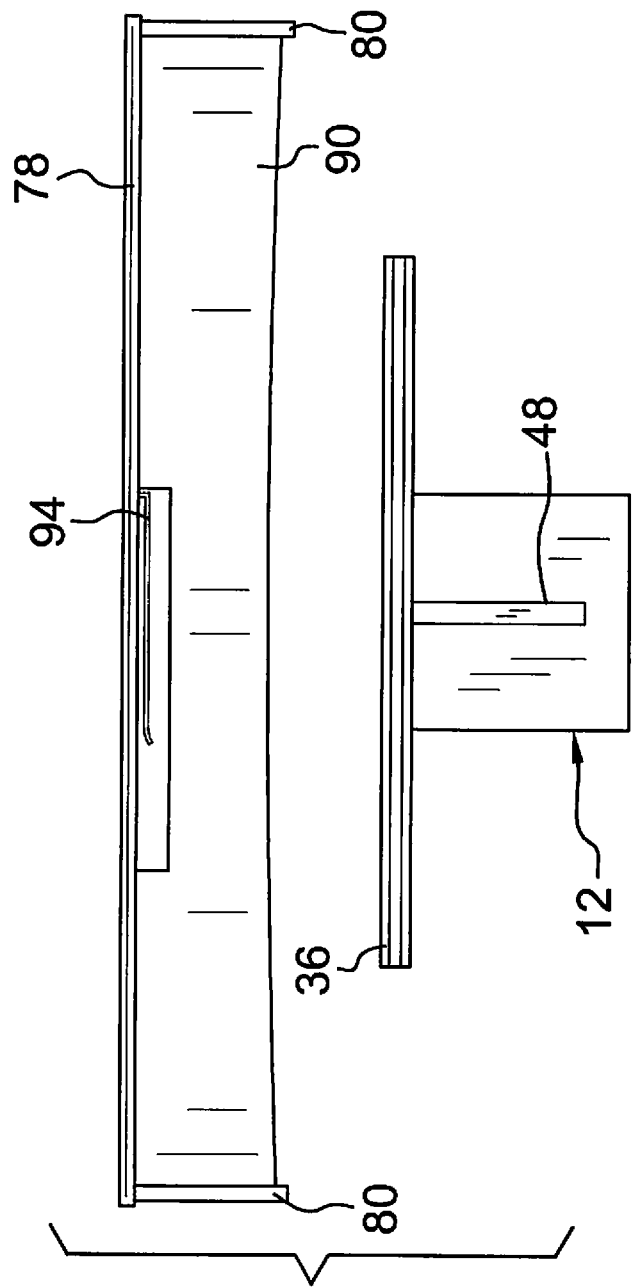
FIG. 4 is a rear view of an embodiment of the disclosure.
Figure 5:
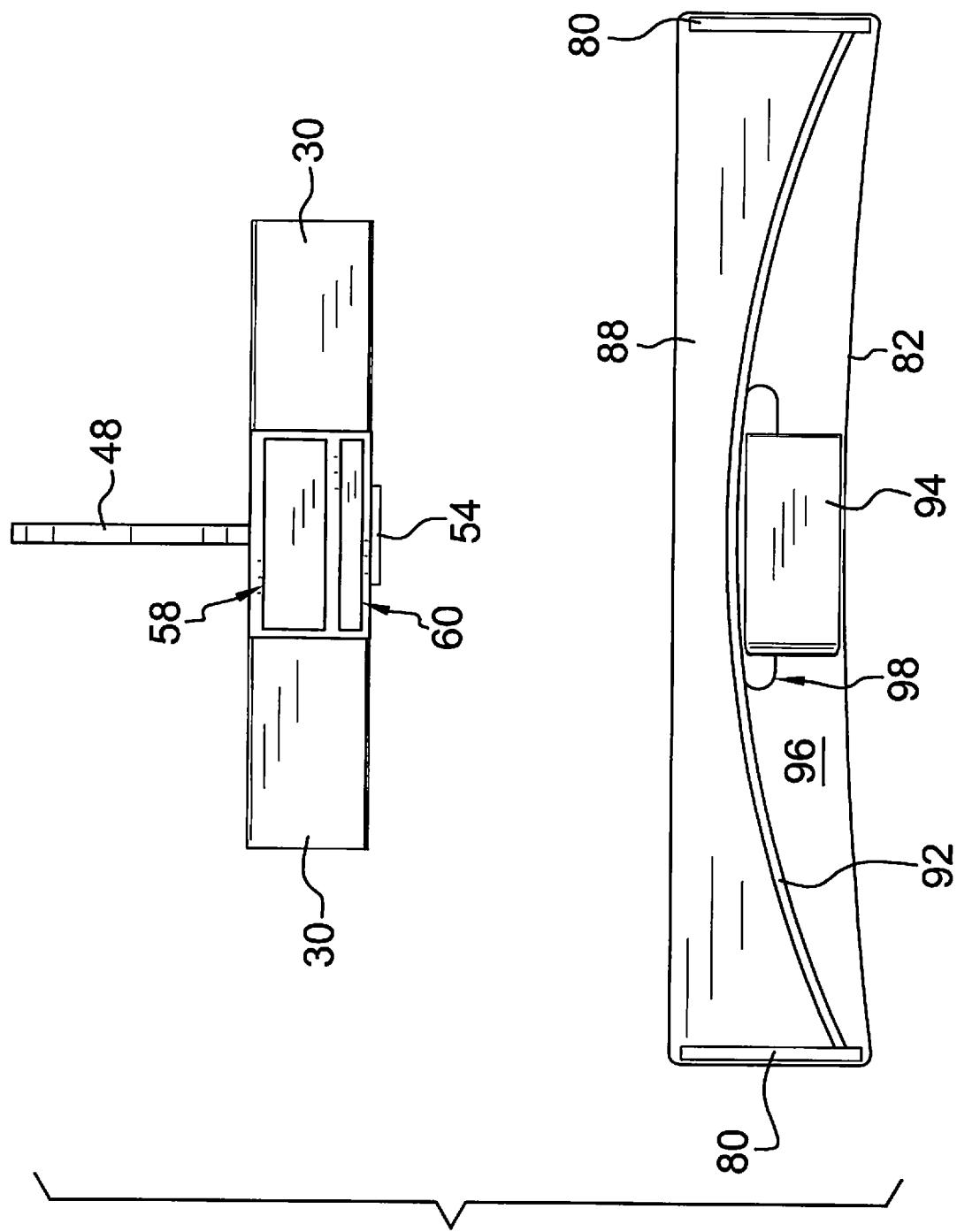
FIG. 5 is a bottom view of an embodiment of the disclosure.

With reference now to the drawings, and in particular to FIGS. 1 through 5 thereof, a new tape measure accessory device embodying the principles and concepts of an embodiment of the disclosure and generally designated by the reference numeral 10 will be described.

As best illustrated in FIGS. 1 through 5, the tape measure attachment device 10 generally comprises a first attachment member 12 having a lower wall 14 and a perimeter wall 16 coupled to and extending upwardly from the lower wall 14. The perimeter wall 16 includes a front wall 18, a back wall 20 and a pair of lateral walls 22 extending between the front wall 18 and the back wall 20. Each of the lateral walls 22 and the back wall 20 has a greater height than the front wall 18. An upper perimeter edge 24 of the first attachment member 12 defines an access opening into the first attachment member 12. The first attachment member 12 is configured for attachment to a flanged end 26 of a measuring tape 28.

A pair of flanges 30 is coupled to the upper perimeter edge 24 of the first attachment member 12. Each of the flanges 30 is coupled to and extends outwardly from an associated one of the lateral walls 22. Each of the flanges 30 has an outer edge 32 positioned distally relative to the first attachment member 12. Each of the flanges 30 has a hole 34 positioned therein. A lid 36 is hingedly coupled to the first attachment member 12. The lid 36 is positionable in an opened position 38 providing access into the first attachment member 12. The lid 36 is positionable in a closed position 40 wherein a bottom surface 42 of the lid 36 abuts an upper surface 44 of each of the flanges 30. A distance between the outer edges 32 of each of the flanges 30 is the same as a length of the lid 36 such that the lid 36 covers an entirety of the flanges 30 when the lid 36 is in the closed position 40.

A pair of prongs 46 is coupled to and extends outwardly from the bottom surface 42 of the lid 36. Each of the prongs 46 is aligned with an associated one of the holes 34 such that each of the prongs 46 is received within the associated hole 34 when the lid 36 is in the closed position 40. A projecting member 48 is coupled to the first attachment member 12. The projecting member 48 extends outwardly from the back wall 20 and is configured for being pulled to extend the measuring tape 28 outwardly of a measuring tape housing 50. A bottom 52 of the projecting member 48 is concavely arcuate. A grip 54 is coupled to and extends outwardly from the lid 36. The grip 54 is configured to facilitate pivoting of the lid 36 between the opened position 38 and the closed position 40.

An interior wall 56 is coupled to and extends upwardly from the lower wall 14. The interior wall 56 extends between each of the lateral walls 22. The interior wall 56 defines a first compartment 58 positioned near the back wall 20 and a second compartment 60 positioned near the front wall 18. The first compartment 58 has an open lower end 62. A gap 64 is formed between the lid 36 and an upper edge 66 of the front wall 18 when the lid 36 is in the closed position 40. The gap 64 is configured to receive the flanged end 26 of the measuring tape 28 therethrough such that the flanged end 26 releasably engages the upper edge 66 of the front wall 18.

A cartridge 68 is positionable within the first compartment 58 by pivoting the lid 36 to the opened position 38. The cartridge 68 includes a pointed bottom end 70 being extendable through the open lower end 62 of the first compartment 58. The cartridge 68 may be one of a pair of cartridges 68. The pointed bottom end 70 of one of the cartridges 68 is a cutting element 72 configured to cut into an object positioned below the cutting element 72. Thus, the cutting element 72 is well-suited for cutting drywall at a specified measurement. The pointed bottom end 70 of another one of the cartridges 68 is a marking element 74 configured to mark the object when the object is positioned below the marking element 74. The marking element 74 may include anything useful for marking other objects. Thus, it may be a pencil, a graphite marking device, or the like. The cartridge 68 having the marking element 74 is disposable when the marking element 74 is used up.

A second attachment member 76 has a top panel 78 and a pair of side panels 80. Each of the side panels 80 is coupled to and extends downwardly from the top panel 78. A first longitudinal side 82 of the top panel 78 is concavely arcuate. An extension 86 is coupled to the second attachment member 76. The extension 86 has a bottom wall 88 and a pair of side walls 90. The side walls 90 are coupled to and extend between the bottom wall 88 and the top panel 78 of the second attachment member 76. The bottom wall 88 has a distal edge 92 with respect to the side wall 90. The distal edge 92 of the bottom wall 88 is concavely arcuate. A clip 94 is coupled to the second attachment member 76. The clip 94 is positioned on a bottom side 96 of the top panel 78. The clip 94 is configured for releasably engaging the measuring tape 28 to prevent twisting of the measuring tape 28. An opening 98 is positioned in the top panel 78. The opening 98 is configured to allow a user to view the measuring tape 28 through the opening 98 and see measuring indicia positioned on the measuring tape 28. Each of the first 12 and second 76 attachment members may be constructed from plastic or like material to prevent a user from getting splinters while using the device 10.

In use, as stated above and shown in the Figures, the appropriate cartridge 68 is placed into the first compartment 58 depending on the user's particular needs. Thus, if the user desires to mark an object, the cartridge 68 having the marking element 74 is positioned in the first compartment 58. Alternatively, if the user desires to cut an object, such as drywall or the like, the cartridge 68 having the cutting element 72 is positioned in the first compartment 58. The measuring tape 28 is then extended outwardly of the measuring tape housing 50 to a desired measurement and secured in a conventional manner. The first attachment member 12 is attached to the flanged end 26 of the measuring tape 28. The user then marks and/or cuts the object at the desired measurement.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A tape measure attachment device comprising:
    a first attachment member having a lower wall and a perimeter wall coupled to and extending upwardly from said lower wall, an upper perimeter edge of said first attachment member defining an access opening into said first attachment member, said first attachment member being configured for attachment to a flanged end of a measuring tape;
    a cartridge being positionable within an interior of said first attachment member, said cartridge including a pointed bottom end being extendable through said lower wall, said pointed bottom end being a cutting element configured to cut into an object positioned below said cutting element; and
    a projecting member coupled to said first attachment member, said projecting member extending outwardly from a back wall of said perimeter wall and being configured for being pulled to extend the measuring tape outwardly of a measuring tape housing.
2. The device of claim 1, further comprising said perimeter wall including a front wall, a back wall and a pair of lateral walls extending between said front wall and said back wall, each of said lateral walls and said back wall having a greater height than said front wall.

3. The device of claim 1, further comprising a bottom of said projecting member being concavely arcuate.

4. The device of claim 1, further comprising:
    wherein said perimeter wall includes a front wall, a back wall and a pair of lateral walls extending between said front wall and said back wall; and
    an interior wall coupled to and extending upwardly from said lower wall, said interior wall extending between each of said lateral walls, said interior wall defining a first compartment positioned near said back wall and a second compartment positioned near said front wall, said first compartment having an open lower end, said pointed bottom end being extendable through said open lower end.

5. The device of claim 1, further comprising said cartridge being one of a pair of said cartridges, said pointed bottom end of one of said cartridges being a marking element configured to mark the object when the object is positioned below said marking element.

6. A tape measure attachment device comprising:
    a first attachment member having a lower wall and a perimeter wall coupled to and extending upwardly from said lower wall, an upper perimeter edge of said first attachment member defining an access opening into said first attachment member, said first attachment member being configured for attachment to a flanged end of a measuring tape;
    a cartridge being positionable within an interior of said first attachment member, said cartridge including a pointed bottom end being extendable through said lower wall, said pointed bottom end being a cutting element configured to cut into an object positioned below said cutting element;
    a pair of flanges coupled to said upper perimeter edge of said first attachment member, each of said flanges being coupled to and extending outwardly from an associated one of said lateral walls, each of said flanges having an outer edge positioned distally relative to said first attachment member; and
    a lid being hingedly coupled to said first attachment member, said lid being positionable in an opened position providing access into said first attachment member, said lid being positionable in a closed position wherein a bottom surface of said lid abuts an upper surface of each of said flanges.

7. The device of claim 6, further comprising a distance between said outer edges of each of said flanges being the same as a length of said lid such that said lid covers an entirety of said flanges when said lid is in the closed position.

8. The device of claim 6, further comprising:
    each of said flanges having a hole positioned therein; and
    a pair of prongs coupled to and extending outwardly from said bottom surface of said lid, each of said prongs being aligned with an associated one of said holes such that each of said prongs is received within said associated hole when said lid is in the closed position.

9. The device of claim 6, further comprising a grip coupled to and extending outwardly from said lid, said grip being configured to facilitate pivoting of said lid between the opened position and the closed position.

10. The device of claim 6, further comprising a gap being formed between said lid and an upper edge of a front wall of said perimeter wall when said lid is in the closed position, said gap being configured to receive the flanged end of the measuring tape therethrough such that the flanged end of the measuring tape releasably engages said upper edge of said front wall.

11. A tape measure attachment device comprising:
   a first attachment member having a lower wall and a perimeter wall coupled to and extending upwardly from said lower wall, an upper perimeter edge of said first attachment member defining an access opening into said first attachment member, said first attachment member being configured for attachment to a flanged end of a measuring tape; and
   a cartridge being positionable within an interior of said first attachment member, said cartridge including a pointed bottom end being extendable through said lower wall, said pointed bottom end being a cutting element configured to cut into an object positioned below said cutting element; and
   a second attachment member having a top panel and a pair of side panels, each of said side panels being coupled to and extending downwardly from said top panel.

12. The device of claim 11, further comprising an opening positioned in said top panel, said opening being configured to allow a user to view the measuring tape through said opening.

13. The device of claim 11, further comprising a clip coupled to said second attachment member, said clip being positioned on a bottom side of said top panel, said clip being configured for releasably engaging a medial portion of the measuring tape to prevent twisting of the measuring tape.

14. The device of claim 11, further comprising an extension coupled to said second attachment member, said extension having a bottom wall and a pair of side walls, said side walls being coupled to and extending between said bottom wall and said top panel of said second attachment member.

15. The device of claim 14, further comprising said bottom wall having a distal edge with respect to said side wall, said distal edge of said bottom wall being concavely arcuate.

16. The device of claim 11, further comprising a first longitudinal side of said top panel being concavely arcuate.

17. The device of claim 11, further comprising:
   said perimeter wall including a front wall, a back wall and a pair of lateral walls extending between said front wall and said back wall, each of said lateral walls and said back wall having a greater height than said front wall;
   a pair of flanges coupled to said upper perimeter edge of said first attachment member, each of said flanges being coupled to and extending outwardly from an associated one of said lateral walls, each of said flanges having an outer edge positioned distally relative to said first attachment member, each of said flanges having a hole positioned therein;
   a lid being hingedly coupled to said first attachment member, said lid being positionable in an opened position providing access into said first attachment member, said lid being positionable in a closed position wherein a bottom surface of said lid abuts an upper surface of each of said flanges, a distance between said outer edges of each of said flanges being the same as a length of said lid such that said lid covers an entirety of said flanges when said lid is in the closed position;
   a pair of prongs coupled to and extending outwardly from said bottom surface of said lid, each of said prongs being aligned with an associated one of said holes such that each of said prongs is received within said associated hole when said lid is in the closed position;
   a projecting member coupled to said first attachment member, said projecting member extending outwardly from said back wall of said perimeter wall and being configured for being pulled to extend the measuring tape outwardly of a measuring tape housing, a bottom of said projecting member being concavely arcuate;
   a grip coupled to and extending outwardly from said lid, said grip being configured to facilitate pivoting of said lid between the opened position and the closed position;
   an interior wall coupled to and extending upwardly from said lower wall, said interior wall extending between each of said lateral walls, said interior wall defining a first compartment positioned near said back wall and a second compartment positioned near said front wall, said first compartment having an open lower end;
   a gap being formed between said lid and an upper edge of said front wall when said lid is in the closed position, said gap being configured to receive the flanged end of the measuring tape therethrough such that the flanged end of the measuring tape releasably engages said upper edge of said front wall;
   said cartridge being positionable within said first compartment, said pointed bottom end being extendable through said open lower end of said first compartment, said cartridge being one of a pair of said cartridges, said pointed bottom end of one of said cartridges being a marking element configured to mark the object when the object is positioned below said marking element;
   a first longitudinal side of said top panel being concavely arcuate;
   an extension coupled to said second attachment member, said extension having a bottom wall and a pair of side walls, said side walls being coupled to and extending between said bottom wall and said top panel of said second attachment member, said bottom wall having a distal edge with respect to said side wall, said distal edge of said bottom wall being concavely arcuate;
   a clip coupled to said second attachment member, said clip being positioned on a bottom side of said top panel, said clip being configured for releasably engaging a medial portion of the measuring tape to prevent twisting of the measuring tape; and
   an opening positioned in said top panel, said opening being configured to allow a user to view the measuring tape through said opening.

* * * * *